United States Patent [19]

Steinke et al.

[11] Patent Number: 5,723,099
[45] Date of Patent: Mar. 3, 1998

[54] METHOD AND APPARATUS FOR REMEDIATION OF TOXIC FLUE GASES

[76] Inventors: Richard A. Steinke, 76 Silver Valley, Munroe Falls, Ohio 44223; Dennis S. Chrobak, 2914 Silver Lake Blvd., Silver Lake, Ohio 44224

[21] Appl. No.: 650,015

[22] Filed: May 17, 1996

[51] Int. Cl.⁶ .......................... B01D 53/46; B01D 53/83
[52] U.S. Cl. .............. 423/210; 423/215.5; 423/239.1; 423/244.01; 423/244.07; 423/DIG. 5; 423/245.1
[58] Field of Search ............... 423/210, 244.08, 423/244.07, 245.1, 215.5, DIG. 5, 244.01, 239.1

[56] References Cited

U.S. PATENT DOCUMENTS

| | | | |
|---|---|---|---|
| 4,219,342 | 8/1980 | Workman | 55/222 |
| 4,588,569 | 5/1986 | Cyran et al. | 423/244 |
| 4,726,940 | 2/1988 | Kobayashi | 423/240 |
| 4,889,698 | 12/1989 | Moller et al. | 423/210 |
| 4,956,162 | 9/1990 | Smith et al. | 423/244 |
| 5,308,590 | 5/1994 | Kersey et al. | 422/170 |
| 5,312,598 | 5/1994 | Kersey et al. | 422/170 |
| 5,332,562 | 7/1994 | Kersey et al. | 423/210 |

FOREIGN PATENT DOCUMENTS

| | | | |
|---|---|---|---|
| 72565 | 9/1991 | Australia | 423/239.1 |
| 0114477 | 8/1984 | European Pat. Off. | 423/244.01 |
| 3633214 | 3/1988 | Germany | 423/239.1 |
| 52-30780 | 3/1977 | Japan | 423/239.1 |
| 61-111126 | 5/1986 | Japan | 423/239.1 |
| 62-46123 | 2/1987 | Japan | 423/DIG. 5 |
| 5-23535 | 2/1993 | Japan | 423/239.1 |
| 8909184 | 10/1989 | WIPO | 423/239.1 |

Primary Examiner—Gary P. Straub
Assistant Examiner—Timothy C. Vanoy
Attorney, Agent, or Firm—Roger D. Emerson

[57] ABSTRACT

Apparatus and method for remediation of particulate matter and gaseous pollutants entrained in flue gases. The flue gases, having a pre-determined moisture content, are mixed with sorbent material and forced through an induct venturi equipped with a mixing impeller. Downstream, the reaction products are removed from the gas stream and collected for use as construction material. The vented gas stream is monitored for specific pollutants and the amount of sorbent material introduced into the system can be automated in response to reading obtained. Additionally, the gas stream can pass through a bag house or cyclone wherein the bags are impregnated with materials specific to the pollutants carried in the stream.

17 Claims, 3 Drawing Sheets

5,723,099

1

METHOD AND APPARATUS FOR REMEDIATION OF TOXIC FLUE GASES

BACKGROUND OF THE INVENTION

1. Field of Invention

This invention pertains to the art of methods and apparatuses for remediation of toxic pollutants carried in flue gases, and more specifically to methods and apparatuses for the removal of pollutants from flue gases by forcing reaction between pollutants and sorbent material through compaction.

2. Description of the Related Art

The combustion of fossil fuels for power generation will yield a variety of particulate matter and gaseous pollutants among which are oxides of sulphur, generally referred to as $SO_x$, oxides of nitrogen, $NO_x$, and volatile organic compounds, VOCs.

Air pollution control systems have been developed to remove fine particulate matter and submicron size particles from polluted gas streams. Some systems rely on electrostatically charged sorbent particles in conjunction with electrostatic-precipitators (ESP) or cyclones to facilitate flue gas remediation.

U.S. Pat. Nos. 5,308,590; 5,312,598; and 5,332,562 to Steinke, et al. disclose methods and apparatuses whereby charged sorbent particles are used to agglomerate and/or react with pollutants. The agglomerated and reacted particles then pass through various arrangements of filter beds to clean the gas stream.

The present invention provides methods and apparatuses for the remediation of toxic flue gases without utilizing electrostatically charged particles or complex filtering systems. The difficulties inherent in those complex systems are therefore overcome in a way which is simple and efficient, while providing better and more advantageous results.

SUMMARY OF THE INVENTION

In accordance with the practice of the present invention, there is provided a new and improved method and apparatus for the remediation of toxic pollutants in flue gases.

More particularly, in accordance with the present invention, reaction between pollutants and sorbent material is enhanced through mixing and compaction of the flue gas and the sorbent material.

For example, a 25 MW (megawatt) Power Plant burning 2% sulphur coal will produce a gas flow rate of ~500,000 ACFM (actual cubic feet per minute) to be remediated. The $SO_x$ can be remediated, for example, by $Ca(OH)_2$ (hydrated lime), CaO (quick lime) or $CaCO_3$/P (limestone/phosphorus mixture). The sorbent choice is dependent upon availability, cost and type of pollutant. The present invention sets forth apparatuses and methods whereby the pollutants in the gas stream are forced into reaction with sorbent material through mixing and compaction, thereby reducing the amount of sorbent material necessary to effectively remediate the gas stream.

According to one aspect of the present invention, an apparatus for removing particulate matter and gaseous pollutants from a gas stream having a pre-determined flow rate, the apparatus comprises a gas inlet for reception of the gas stream; a duct, the duct defining a passageway communicating with the inlet at a first end and having a length and a first cross-sectional area; delivery means for delivering a sorbent material to the duct at a sorbent introduction site, the delivery means being able to introduce the sorbent material at a predetermined feed rate; compacting means for reducing the cross-sectional area of the passageway, the compacting means being located downstream from the sorbent introduction site; removal means for removing reaction products being formed from interaction of the sorbent material and the gas stream; and, an outlet for venting the gas stream from the apparatus after the reaction products are removed.

According to another aspect of the invention, a controlling means for controlling the moisture level of the gas stream is able to introduce water to the gas stream to achieve a pre-determined moisture level; the controlling means being located upstream from the sorbent introduction site.

According to another aspect of the invention, a monitoring means for monitoring the level of the pollutants in the gas stream includes an automation means for automatically adjusting the sorbent feed rate in response to the pollutant level.

According to another aspect of the invention, a bag house communicates with a second end of the passageway, the bag house comprising a plurality of bags, each of the bags being formed of bag material and having an outer surface to provide reaction sites for the reaction of sorbent material with the pollutants forming the reaction products. An impulser is capable impulsing one of the bags to loosen the reaction products from the outer surface.

According to another aspect of the invention, a gas sensor which monitors the flue outlet controls the volume of sorbent material fed into the system.

According to another aspect of the invention, the $SO_x$ remediated from the combustion of fossil fuels is converted to gypsum, $CaSO_4$, $CaSO_3$ or like material for use as a building material.

One advantage of the present invention is the low set-up, operating and maintenance costs associated therewith.

Another advantage of the present invention is the increased efficiency of the overall system.

Another advantage of the present invention is the ability to adapt the system to particular pollutants.

Another advantage of the present invention is the ability to retrofit existing power plants with the inventive remediation system.

Another advantage of the present invention is the elimination of foreign air being introduced into the system.

Still other benefits and advantages of the invention will become apparent to those skilled in the art upon a reading and understanding of the following specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
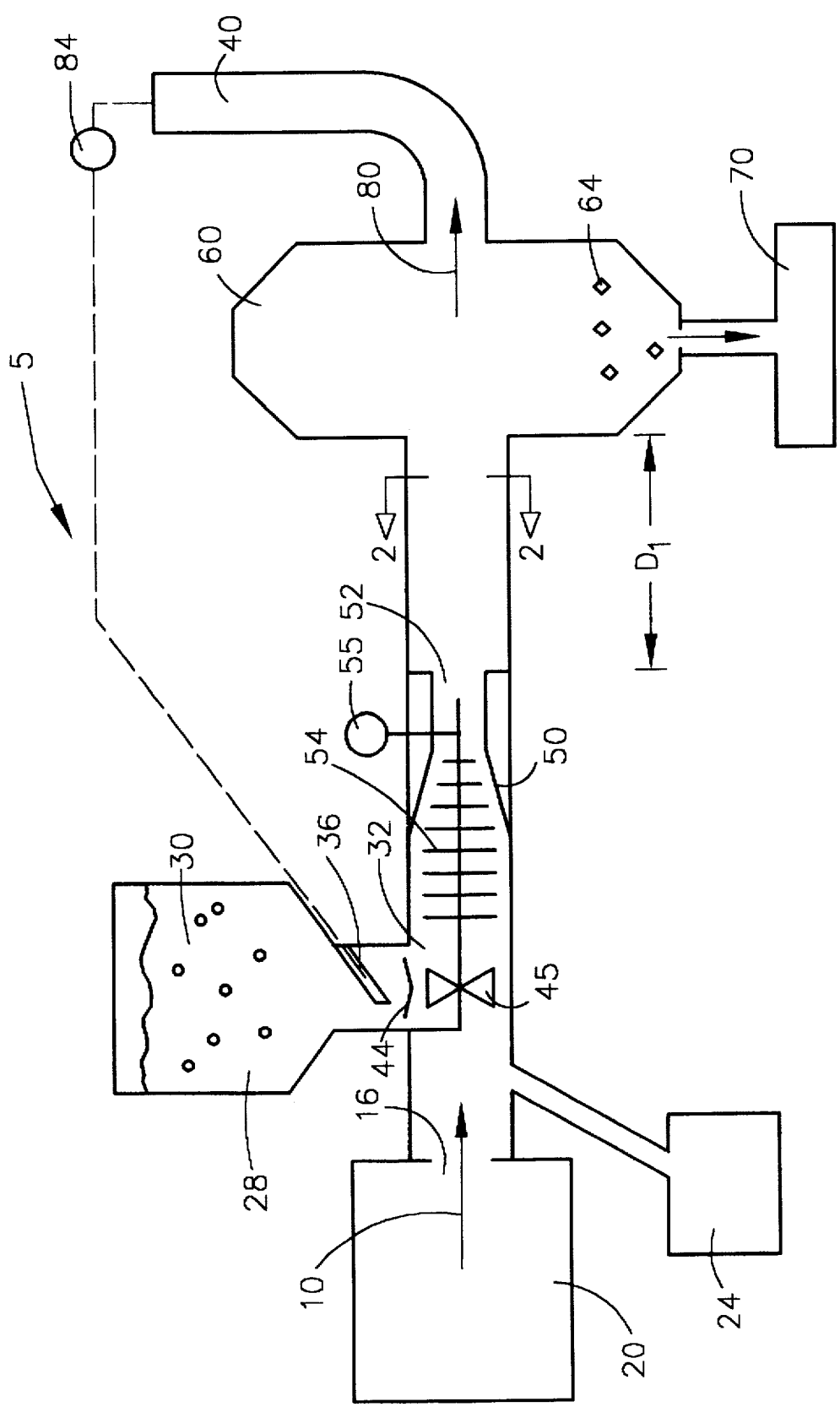
FIG. 1 is a schematic, side view representation an apparatus and method for remediation of polluted gas streams according to the invention.

Referring now to the drawings wherein the showings are for purposes of illustrating a preferred embodiment of the invention only and not for purposes of limiting the same. FIG. 1 shows a schematic representation of an apparatus 5 for removing particulate matter and gaseous pollutants from a polluted gas stream 10, indicated by arrow 10. Apparatus 5 includes duct 12 having an inlet 16 for the reception of a flue gas stream 10 from source 20 such as a power plant (not shown). Apparatus 5 further includes a moisture-level controller, or mister 24, which is capable of introducing water vapor into duct 12 if the moisture level of the gas stream 10 is below a predetermined and desired level.

Sorbent material 28 is held within hopper 30 and fed into duct 12 downstream from the moisture controller 24 at a sorbent introduction site 32. The rate at which the sorbent material 28 enters duct 12 is determined by a damper 36 or other control means. As will be discussed in further detail later in this specification, damper 36 may be automated according to the level of pollutants vented through outlet 40. In a preferred embodiment, the sorbent material 28 passes through a gravity auger feeder 44 which serves to provide diffusion of the sorbent material within duct 12. The sorbent introduction site 32 may also be equipped with means for reducing the sorbent particle size 45 before the sorbent material 28 contacts the gas stream 10.

In a preferred embodiment, the moisture level of the wet gas stream 10 is between 8% and 14%. Although the methods and apparatus of the present invention are operable when the moisture level is not within the preferred range, it is believed that a moisture content below 8% requires a greater amount of sorbent material 28 to be introduced into the system while a moisture content greater than 14% creates a slurry which decreases the efficiency of reaction product collection. It is further believed that efficient reaction between pollutants in the gas stream 10 and sorbent material 28 occurs on the surface of water vapor molecules therefore the presence of a predetermined level of moisture provides an optimal number of reaction sites, thereby minimizing residence time.

In a preferred embodiment, the moisture level of the gas stream 10 is adjusted before the gas stream 10 contacts the sorbent material 28.

Figure 2:
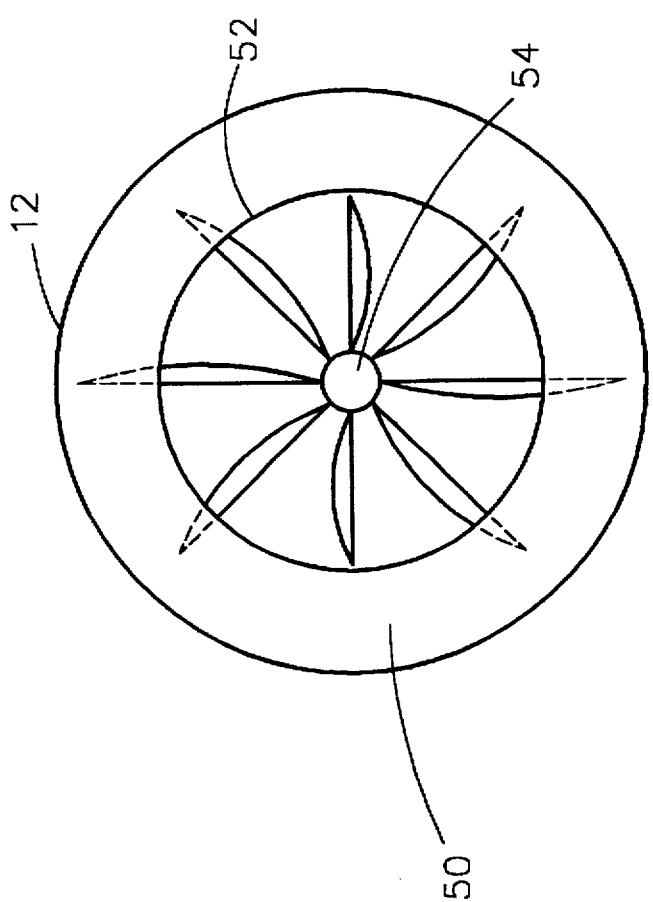
FIG. 2 is an end view of a venturi taken along 2—2 of FIG. 1.

Means for volumetric compaction of the gas stream 10 and diffused sorbent material 28 is positioned downstream from the sorbent introduction site 32. In a preferred embodiment, the compaction means comprises a conical venturi 50 which is equipped with an impeller 54. As shown in FIG. 2, in a preferred embodiment, the outlet 52 of venturi 50 has a cross-sectional area approximately one-third the cross-sectional area of duct 12. Impeller 54 is preferrably unpowered but rotates in response to the gas stream moving through venturi 50 to provide increased mixing between pollutants entrained in the gas Stream 10 and sorbent material 28. Impeller 54 further acts to boost the movement of gas stream through apparatus 10. It should be noted that in its preferred embodiment, the apparatus 10 does not require blowers or introduction of foreign air in order to move the gas stream 10 and diffused sorbent material 28 through duct 12. In another embodiment of the invention, impeller 54 may be equipped with powering means such as motor 55 in order to control duct pressure.

The compaction and mixing of the pollutants entrained in the gas stream 10 and sorbent material 28 promotes chemical reactions therebetween. The reaction products are also carried further downstream through the action of the gas stream 10 and impeller 54. It is believed that the compaction and mixing of the gas stream 10 and the sorbent material 28 within duct 12 allows the volume of sorbent material 28 required to remediate a given amount of pollutants to be significantly reduced over prior art remediation systems.

With reference again to FIG. 1, duct 12 extends a distance $D_1$ downstream from venturi 50. Further reaction between pollutants and sorbent material 28 occurs in this region of duct 12. The reaction products so formed depend on a variety of factors including moisture content, sulphur content, type of sorbent material utilized, reaction temperature, residence time (residence time being the time the pollutants and sorbent are in proximity to each other), and so on.

Figure 3:
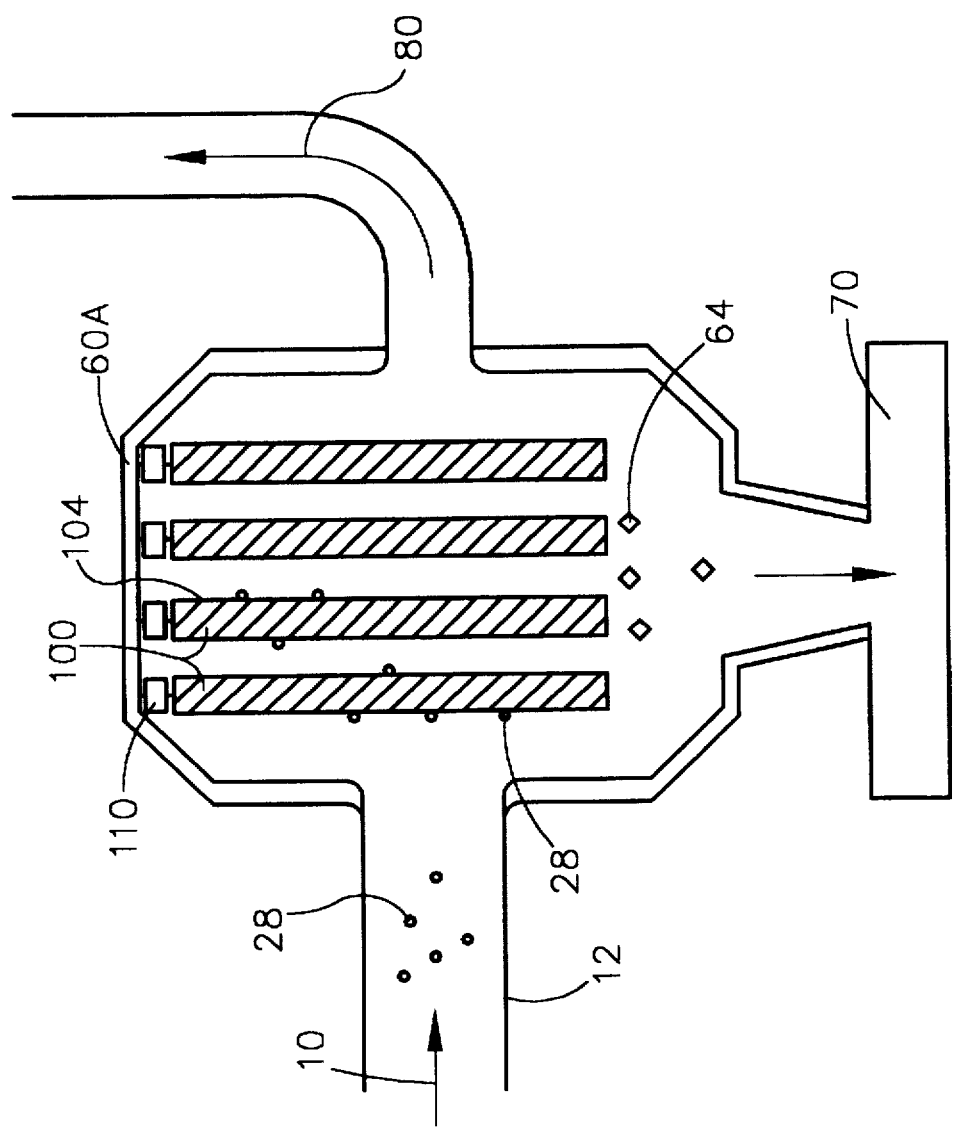
FIG. 3 is a front sectional view of a bag house according to the invention.

Duct 12 communicates with at least one precipitate remover 60. Generally, the reaction products 64 are removed from the gas stream 10 and collected in a precipitate collector 70. Precipitate remover 60 may be a cyclone, a bag house 60A, as shown in FIG. 3, or other collector as is known in the art chosen with sound engineering judgment.

The cleaned gas stream 80, indicated by arrow 80, is vented to the atmosphere through outlet 40. In a further embodiment of the invention, outlet 40 is equipped with gas sensor 84. The gas sensor 84 monitors the quality of the air exiting the system and specifically monitors particular pollutants such as $SO_x$. The gas sensor 84 cooperates with and controls the adjustable damper 36 to increase or decrease the volume of sorbent material 28 fed to duct 12 in order to maximize the efficiency of the system with the minimal acceptable amount of pollutant being released to the atmosphere. In a preferred embodiment, damper 36 is automated to respond to the level of pollutants detected by gas sensor 40.

A preferred gas sensor for analyzing $SO_2$ levels is Thermo Environmental Instruments Inc, Model 43C. Model 42C from the same company is a preferred gas sensor for analyzing $NO_x$ levels.

Applicants have found that apparatus 5 of the present invention, using a suitable sorbent material 28, and incorporating a cyclone as precipitate remover 60 is able to effectively remove at least 80% of the $SO_x$ from the gas stream.

FIG. 3 shows a bag house 60A which may be used as a precipitate remover in the present invention. Situated within bag house 60A is a plurality of bags 100 each having an outer surface 104. The gas stream 10 carries the sorbent material 28 into bag house 60A. The bag surfaces 104 are coated and/or impregnated with sorbent material 28 as it enters the bag house through duct 12. The pollutants entrained in gas stream 10 react with sorbent material 28 to form reaction products 64. Generally, the reaction products 64 comprise flakes or powder which fall from bags 100 and are collected in precipitate collector 70.

Bags 100 may be equipped with impulsers 110 which impulse the bags to shake off any reaction products 64 which adhere to bag surfaces 104. Removal of reaction products 64 from bag surfaces 104 allows more efficient chemical reactions between sorbent material 28 and pollutants. Therefore, the impulsers 110 can be automatically controlled to impulse the bags 100 in response to the pollutant levels determined by gas analyzer 84. Alternately, the impulsers 110 can be automated to impulse the bag 100 at pre-determined intervals.

In a preferred embodiment, the bags 100 are formed of nylon. The bags 100 may be impregnated with various compounds in order to improve their efficiency in removing particular pollutants from the gas stream. For example, bags 100 which are impregnated with carbon can effectively remove $NO_x$ and VOCs from polluted gas streams. The bags 100 can also be impregnated with limestone, hydrated lime, a phosphorous/limestone blend, a phosphorous/hydrated lime blend, a mixture of calcium, magnesium and hydrated lime, or a mixture specific for the particular pollutants present in the gas stream 10.

The preferred methods for remediating a polluted gas stream 10 according to the present invention will now be described.

The gas stream 10 generated by the combustion of fossil fuels is fed into apparatus 5 so that entrained pollutants can be effectively removed. The gas stream 10 is received within duct 12 through inlet 16. The moisture level of the gas stream 10 is monitored. In a preferred method, the moisture level is adjusted to be within 8% to 14% by the use of a mister 24.

Downstream from inlet 16 is the sorbent introduction site 32. In the preferred method, the moisture level of the gas stream 10 is adjusted before sorbent material 28 is introduced.

Sorbent material 28 is fed from hopper 30 through an adjustable damper 36 into duct 12 with a gravity auger feeder 44. The sorbent material 28 is thereby diffused within duct 12. It is an object of the present invention to regulate the volume of sorbent material 28 introduced into duct 12 so that a minimum amount of sorbent material 28 is used to achieve a pre-determined level of remediation.

The gas stream 10, with entrained pollutants, encounters sorbent material 28 within duct 12. The movement of the gas stream 10 carries the sorbent material downstream. In a preferred method, the gas stream 10 and sorbent material 28 is volumetrically compacted by being forced through a venturi 50. It is believed that the compaction allows initial reactions to occur between pollutants and sorbent material 28.

In a preferred method, the gas stream 10 and sorbent material 28 are vigorously mixed within venturi 50 through the action of impeller 54. Impeller 54 is equipped with a plurality of blades 56. The motion of the gas stream 10 rotates the impeller 54. The action of blades 56 provides mixing of sorbent material 28 and gas stream 10 as well as serving as a booster to move the gas stream 10, sorbent material 28, and any initial reaction products 64 further downstream.

Downstream from venturi 50, duct 12 extends a distance $D_1$. In the preferred method, this region of duct 12 provides residence time for pollutants to react with sorbent material 28.

Duct 12 communicates with at least one precipitate remover 60. In the preferred method, the reaction products 64 are separated from the cleaned gas stream 80, and are collected in a precipitate collector 70.

The cleaned gas stream 80 is then vented to the atmosphere through outlet 40.

In the preferred method, the cleaned gas stream 80 is monitored by a gas sensor 84 which detects the level of particular pollutants. The gas sensor cooperates with damper 36 to regulate the amount of sorbent material 28 introduced into duct 12. In this way, sorbent material 28 can be introduced in order to reach and maintain a pre-determined level of remediation.

Following are some examples of the use of the sorbent material 28 which may be incorporated into the present invention. Such examples are intended to be exemplary and not exhaustive or limiting.

EXAMPLE I

A 125 MW power plant burning a fossil fuel containing from 2.5% to 3% sulphur generates a gas stream of 638,300 acfm to be remediated. The wet flue gas, at a temperature of 140° C. comprises 10% to 11% water, 1000 ppm sulphur dioxide, and 0.021% heavy oil ashes. The sorbent material used in the remediation process is a dry powder comprising: 51.8% CaO, 0.78% MgO, 4.51% SiO, 0.42% $Fe_2O_n$, and 0.83% $Al_2O_3$ having a particle size of less than 0.074 mm. The sulphur dioxide is required to be removed at over 90% efficiency. The preferred reaction product ($\geq 90\%$) is gypsum ($CaSO_4 \bullet H_2O$). The gypsum can then be used as a building material.

EXAMPLE II

Flue gas having a flow rate of approximately 1,500 cfm and having a sulphur sorbent of approximately 1,100 ppm can be remediated with high magnesium hydrated lime sorbent material comprising from 1.0 to 28.73% MgO being introduced at a feed rate of from 17.6 lbs/hr to 24 lbs/hr. The sorbent material is initially introduced to the system at a rate near the high end of the feed rate range. The bags in a downstream bag house are coated with the chosen sorbent material. As the bags become coated, the feed rate of sorbent material is reduced. The bags may be impulsed to free their surfaces of collected reaction products. The feed rate of sorbent material may again be increased to effectively re-coat the bags. In this way, the sorbent material is efficiently fed to the system.

EXAMPLE III

Flue gas containing from 1–4% $SO_x$ and 10–14% $H_2O$ having a flow rate of approximately 2000 acfm produces approximately 825 lb/hr of $SO_2$ to be remediated. Utilizing dolomite ($Ca(OH)_2 \cdot Mg(OH)_2$) in a remediation system without a compacting venturi requires that the sorbent be fed at 22.1 to 1 Ca/S stoichiometry to achieve the same level of remediation as 1:1 Ca/S stoichiometry in a system having a compacting venturi.

The preferred embodiments of the invention have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A process for remediation of particulate matter and gaseous pollutants including oxides of sulfur and nitrogen and volatile organic compounds in a gas stream comprising the steps of:

receiving said gas stream within a duct through a gas inlet;

introducing sorbent material into said duct at a sorbent introduction site downstream from said gas inlet, said sorbent material being selected for the particular pollutants in said gas stream;

providing a turbo powered venturi compressor within said duct adjacent said sorbent introduction site to control duct pressure drop, said turbo venturi compressor including an impeller and being operable to compact said gas stream and said sorbent material by reducing the cross-sectional area of said duct;

mechanically impelling said gas stream and said sorbent material through said turbo venturi compressor by rotation of said impeller;

reacting said particulate matter and said gaseous pollutants with said sorbent material to form reaction products;

removing said reaction products; and, venting said gas stream through an outlet after collecting said reaction products.

2. The process of claim 1 further comprising the steps of:

monitoring a moisture level of said gas stream upstream from said sorbent introduction site; and, adjusting said moisture level of the gas stream upstream from said sorbent introduction site to maintain said moisture level to between 8% and 14%.

3. The process of claim 1 further comprising the step of:

monitoring said vented gas stream for pollutant levels.

4. The process of claim 3 further comprising the step of:

adjusting the flow rate of sorbent material in accordance with said pollutant levels.

5. The process of claim 1 wherein said step of removing reaction products includes passing said gas stream and said sorbent material into a bag house, said bag house being equipped with a plurality of bags, each bag having an outer surface for providing reaction sites for reacting said sorbent material and said pollutants to form said reaction products.

6. The process of claim 5 wherein said step of removing said reaction products further includes impulsing said bags to remove any of said reaction products which adhere to said reaction sites.

7. The process of claim 1 further including:

collecting the reaction products.

8. The process of claim 7 wherein said step of collecting reaction products includes collecting gypsum for use as a construction material.

9. The process of claim 1 wherein said sorbent material is at least one member selected from the group consisting of hydrated lime, quicklime, a limestone/phosphorus mixture, high magnesium hydrated lime, and dolomite.

10. A process for remediation of particulate matter and gaseous pollutants consisting of oxides of sulfur and nitrogen and volatile organic compounds in a gas stream comprising the steps of:

receiving said gas stream within a duct through a gas inlet;

gravity feeding sorbent material into said duct at a sorbent introduction site downstream from said gas inlet, said sorbent material being selected for the particular pollutants in said gas stream;

monitoring a moisture level of said gas stream upstream from said sorbent introduction site;

adjusting said moisture level of the gas stream upstream from said sorbent introduction site to maintain said moisture level to between 8% and 14%;

providing a powered turbo venturi compressor within said duct adjacent said sorbent introduction site, said turbo venturi compressor including an impeller and being operable to compact said gas stream and said sorbent material by reducing the cross-sectional area of said duct;

mechanically impelling said gas stream and said sorbent material through said turbo venturi compressor by rotation of said impeller;

passing said gas stream and said sorbent material into a bag house, said bag house being equipped with a plurality of bags, each bag having an outer surface for providing reaction sites for reacting said sorbent material and said pollutants to form said reaction products;

impulsing said bags to remove any of said reaction products which adhere to said reaction sites;

collecting said reaction products;

venting said gas stream through an outlet after collecting said reaction products;

monitoring said vented gas stream for pollutant levels; and, adjusting said flow rate of sorbent material in accordance with said pollutant levels.

11. The process of claim 10 wherein said bags are impulsed in response to said monitored pollutant levels.

12. The process of claim 10 wherein said bags are automatically impulsed at predetermined intervals.

13. The process of claim 10 wherein said sorbent material is at least one member selected from the group consisting of hydrated lime, quicklime, and a limestone/phosphorus mixture.

14. The process of claim 10 wherein said sorbent material is at least one member selected from the group consisting of $CaO$, $MgO$, $SiO$, $Fe_2O_3$ and $Al_2O_3$.

15. The process of claim 10 wherein said sorbent material is high magnesium hydrated lime comprising from 1.0% to 28.7% $MgO$.

16. The process of claim 10 wherein said sorbent material comprises dolomite.

17. A process for remediation of particulate matter and gaseous pollutants consisting of oxides of sulfur and nitrogen and volatile organic compounds in a gas stream comprising the steps of:

receiving said gas stream within a duct through a gas inlet;

providing a hopper for gravity feeding sorbent material into said duct at a sorbent introduction site downstream from said gas inlet, said sorbent material being selected for the particular pollutants in said gas stream;

providing a particle size reducer for reducing the size of the sorbent material as said sorbent material is introduced into said duct;

monitoring the moisture level of said gas stream upstream from said sorbent introduction site;

adjusting said moisture level of the gas stream upstream from said sorbent introduction site to maintain said moisture level to between 8% and 14%;

providing a powered turbo venturi compressor within said duct adjacent said sorbent introduction site, said turbo venturi compressor including an impeller and being operable to compact said gas stream and said sorbent material by reducing the cross-sectional area of said duct;

mechanically impelling said gas stream and said sorbent material through said turbo venturi compressor by rotation of said impeller;

reacting said particulate matter and said gaseous pollutants with said sorbent material to form reaction products;

removing said reaction products; and, venting said gas stream through an outlet after collecting said reaction products.

* * * * *